United States Patent [19]

Sorin et al.

[11] Patent Number: 4,778,237

[45] Date of Patent: Oct. 18, 1988

[54] SINGLE-MODE FIBER OPTIC SATURABLE ABSORBER

[75] Inventors: Wayne V. Sorin, Stanford; Robert C. Youngquist, Mountain View; Cassius C. Cutler, Palo Alto; Herbert J. Shaw, Stanford, all of Calif.

[73] Assignee: The Board of Trustees of the Leland Stanford Junior University, Stanford, Calif.

[21] Appl. No.: 618,032

[22] Filed: Jun. 7, 1984

[51] Int. Cl.$^4$ .............................................. G02B 6/26
[52] U.S. Cl. ............................. 350/96.15; 350/96.29; 350/320
[58] Field of Search ............... 350/96.15, 96.16, 96.29, 350/96.30, 320

[56] References Cited

U.S. PATENT DOCUMENTS

| 4,264,126 | 4/1981 | Sheem .................... 350/96.15 |
| 4,386,822 | 6/1983 | Bergh .................... 350/96.29 X |
| 4,387,954 | 6/1983 | Beasley .................. 350/96.15 |
| 4,473,270 | 9/1984 | Shaw ..................... 350/96.15 |
| 4,479,701 | 10/1984 | Newton et al. ........... 350/96.16 |
| 4,536,058 | 8/1985 | Shaw et al. ............. 350/96.15 X |
| 4,546,476 | 10/1985 | Shaw et al. ............. 372/6 |
| 4,557,551 | 12/1985 | Dyott ................... 350/96.15 |
| 4,589,728 | 5/1986 | Dyott et al. ............ 350/96.15 X |
| 4,603,940 | 8/1986 | Shaw et al. ............. 350/96.15 |

OTHER PUBLICATIONS

Bergh, R. A., et al., "Single-Mode Fiber-Optic Polarizer", Optics Letters, vol. 5, No. 11, Nov., 1980, pp. 479–481.

Bergh, R. A., et al., "Single-Mode Fiber-Optic Directional Coupler", Electronics Letters, vol. 16, No. 7, Mar. 27, 1980, pp. 260–261.

Lamouroux, B. F., et al., "Continuous Laser Amplification In A Monomode Fiber Longitudinally Pumped by Evanescent Field Coupling", Optics Letters, vol. 8, No. 9, Sep., 1983, pp. 504–505.

Sorin, W. V., et al., "Evanescent Amplification In A Single-Mode Optical Fiber", Electronics Letters, vol. 19, No. 20, Sep. 29, 1983, pp. 820–822.

De Maria, A. J., et al., "Self Mode-Locking of Lasers with Saturable Absorbers", Applied Physics Letters, vol. 8, No. 7, Apr. 1, 1966, pp. 174–176.

Kafalas, P., et al., "Photosensitive Liquid Used as A Nondestructive Passive Q-Switch in a Ruby Laser", Journal of Applied Physics, vol. 35, No. 8, Aug., 1964, pp. 2349–2350.

Hercher, M., "An Analysis of Saturable Absorbers", Applied Optics, vol. 6, No. 5, May, 1967, pp. 947–954.

Cutler, C. C., "The Regenerative Pulse Generator", Proceedings of the I.R.E., vol. 43, Feb., 1955, pp. 140–148.

Batashev, S. P., et al., "Investigation of Bleaching and Relaxation of a Stable Passive Neodymium-Laser Switch Utilizing a Phthalocyanine Dye", Sov. J. Quantum Electron., 9(11), Nov., 1979, pp. 1431–1433.

Stolen, R. H., et al., "Intensity Discrimination of Optical Pulses With Birefringent Fibers", Optics Letters, vol. 7, No. 10, Oct. 1982, pp. 512–514.

Primary Examiner—John Lee
Attorney, Agent, or Firm—Knobbe, Martens, Olson & Bear

[57] ABSTRACT

A fiber optic saturable absorber for processing optical signals comprises an optical fiber from which a portion of the cladding is removed to form a facing surface. A light-absorbing substance having non-linear light-absorbing characteristics is applied to the facing surface such that a portion of the optical signal energy is transferred from the fiber to the substance where it is absorbed. The device selectively attenuates the optical signal and noise, and can be used to reduce pulse waveform distortion caused by pulse broadening and by amplification of system noise.

14 Claims, 4 Drawing Sheets

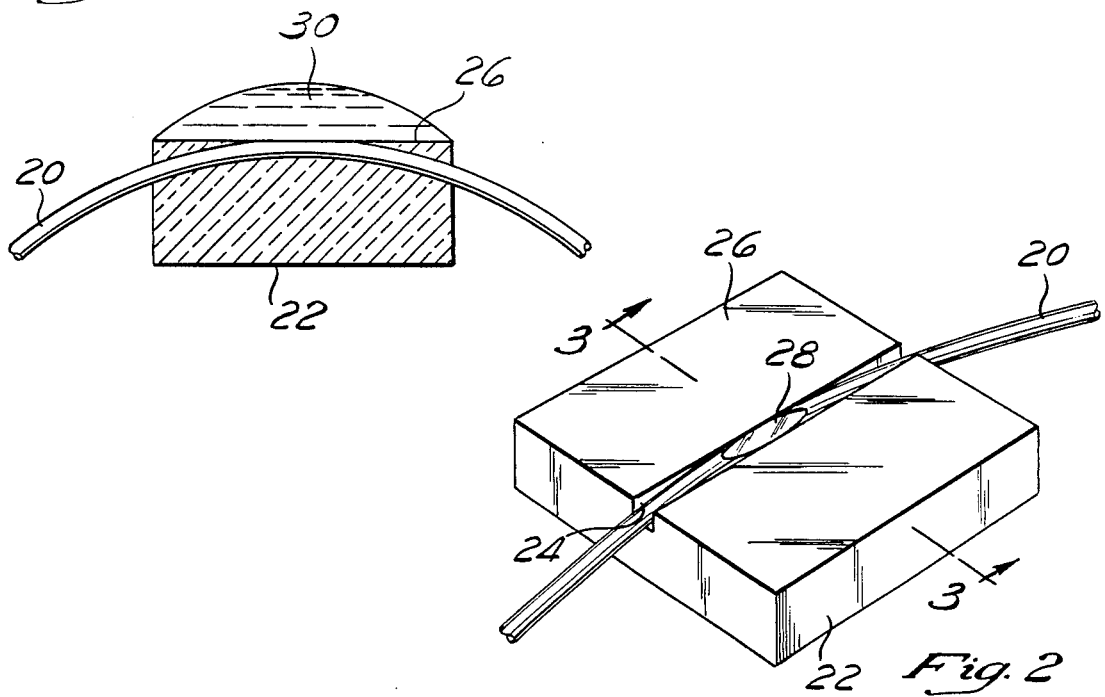
Fig. 1
Fig. 2
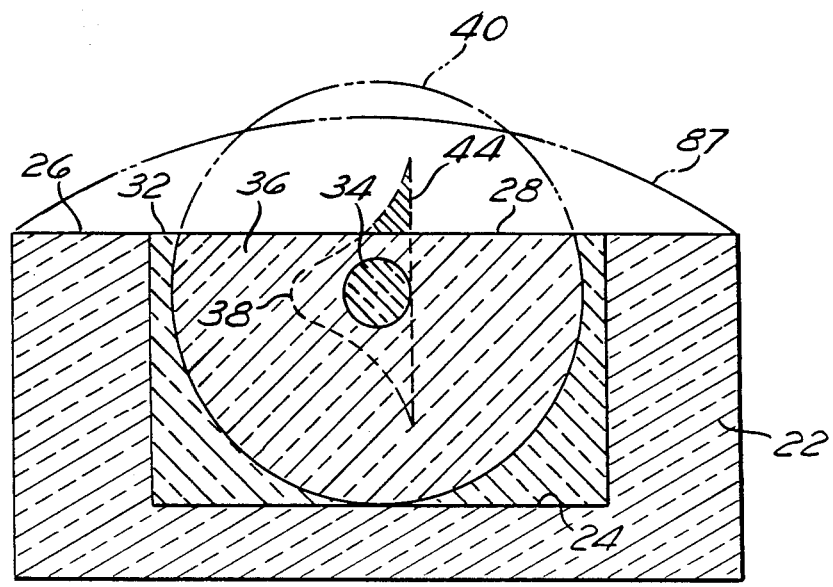
Fig. 3

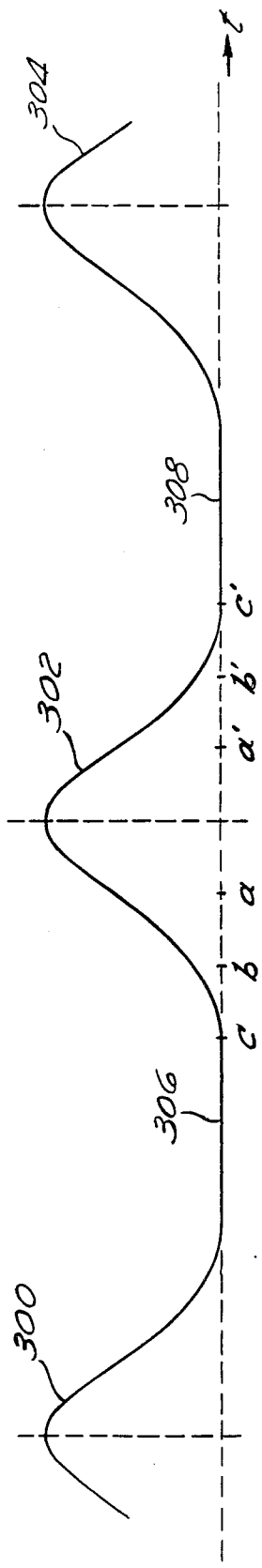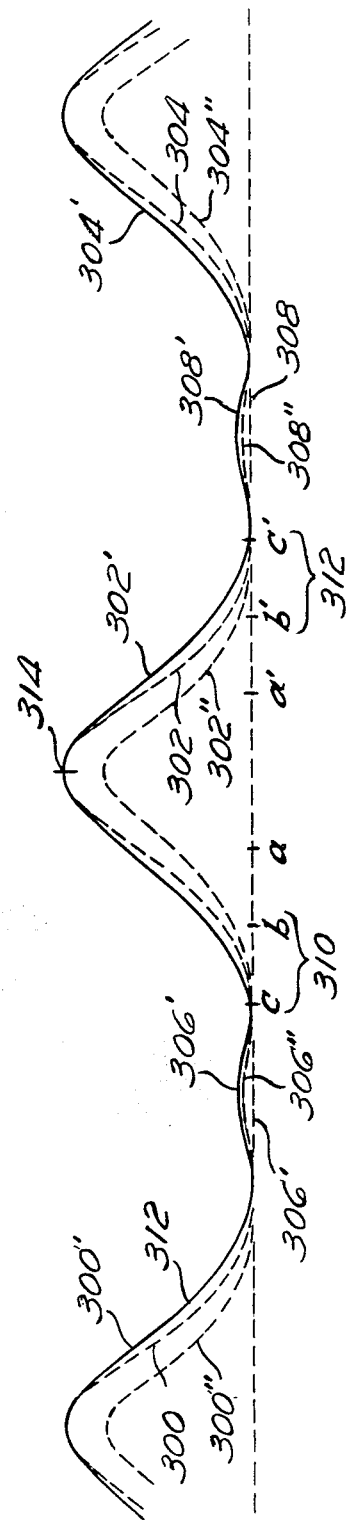

SINGLE-MODE FIBER OPTIC SATURABLE ABSORBER

BACKGROUND OF THE INVENTION

The invention relates to the field of optical signal conditioners, and, specifically, to the art of attenuating optical signals using a saturable absorbing substance.

In recent years, a number of optical fiber systems have been disclosed which replace mechanical and electrical devices. For instance, optical fiber gyroscopes have been developed which provide an accuracy and range comparable to mechanical systems, without requiring the use of moving parts. Optical fiber systems have been used extensively in the field of communications, and are being used increasingly in the field of computations.

One particular use of an optical fiber system is in splice-free optical fiber recirculating memory/delay lines such as described in U.S. Pat. No. 4,373,270, issued on Sept. 25, 1984 and as described in U.S. Pat. No. 3,479,701, issued on Oct. 30, 1984; both of which are incorporated herein by reference. The referenced devices utilize passive optical fiber components to achieve data recirculation within an optical fiber loop. In order to achieve a larger number of recirculations, an amplifier can be inserted into the fiber loop to maintain the recirculating pulses at a usable level. Fiber dispersion and the use of active devices to amplify the signal pulses within the loop can cause distortion of the pulses and can also result in extraneous noise signals, thus resulting in the possible loss of recirculating data. Additionally, amplification of the recirculating signal can result in loss of data by causing the leading and trailing edges of the pulse signal to increase in amplitude, thus broadening the pulse width and therefore reducing the maximum data rate of the recirculating device. Accordingly, there is a need in the art for a signal conditioner which restores the pulse shape after amplification and fiber dispersion and which reduces amplified noise.

SUMMARY OF THE INVENTION

The present invention comprises an in-line fiber optic saturable absorber, which accomplishes nonlinear filtering of signals and noise in an optical fiber system. This saturable absorbing device comprises an optical fiber having a core and a cladding. A portion of the cladding is removed to form a facing surface on the fiber. A light-absorbing substance, having nonlinear light-absorbing characteristics, such as a saturable absorbing dye, is applied to the facing surface. A sufficient amount of cladding is removed from the fiber such that the evanescent field of an optical signal propagating through the fiber penetrates the facing surface for absorbtion by the light-absorbing dye. The absorbing characteristics of the dye are such that the percentage of absorption of the optical signal decreases as the intensity of the optical signal increases.

At low optical signal intensities, a significant fraction of the light signal passing through the optical fiber in the area of the saturable dye is absorbed by the dye. At higher signal intensities, a smaller percentage of the optical signal is absorbed. Since the leading and trailing edges of a data pulse signal which has been broadened by amplification and fiber dispersion have substantially lower signal levels than the data pulse, the absorbing dye will absorb a much larger fraction of the leading and trailing edges than of the data pulse itself. Thus, through selective attenuation, the width of the data pulse will be reduced toward its original width. Similarly, the above-described nonlinear filter characteristics of the saturable absorber cause the low-level noise between data pulses to be attenuated relatively more than the high-level data pulses.

BRIEF DESCRIPTION OF THE DRAWINGS

FIG. 1 is an elevation view of the saturable absorber of the invention, in partial cross-section, showing the fiber and fiber holder, and schematically illustrating the absorbing dye solution applied thereto;

FIG. 2 is a perspective view of the fiber and fiber holder of the saturable absorber;

FIG. 3 is a partial cross-sectional view of the fiber and holder of FIG. 2 taken along the line 3—3 in FIG. 2;

FIG. 9 represents an exemplary ideal data signal output from the optical fiber recirculating memory device of FIG. 8; and FIG. 10 illustrates an exemplary non-ideal data signal output from the optical fiber recirculating memory device of FIG. 8, illustrating the effect of noise and distortion on the data signal and the effect of the present invention in attenuating the noise and distortion.

DETAILED DESCRIPTION OF THE PREFERRED EMBODIMENT

Figure 4:
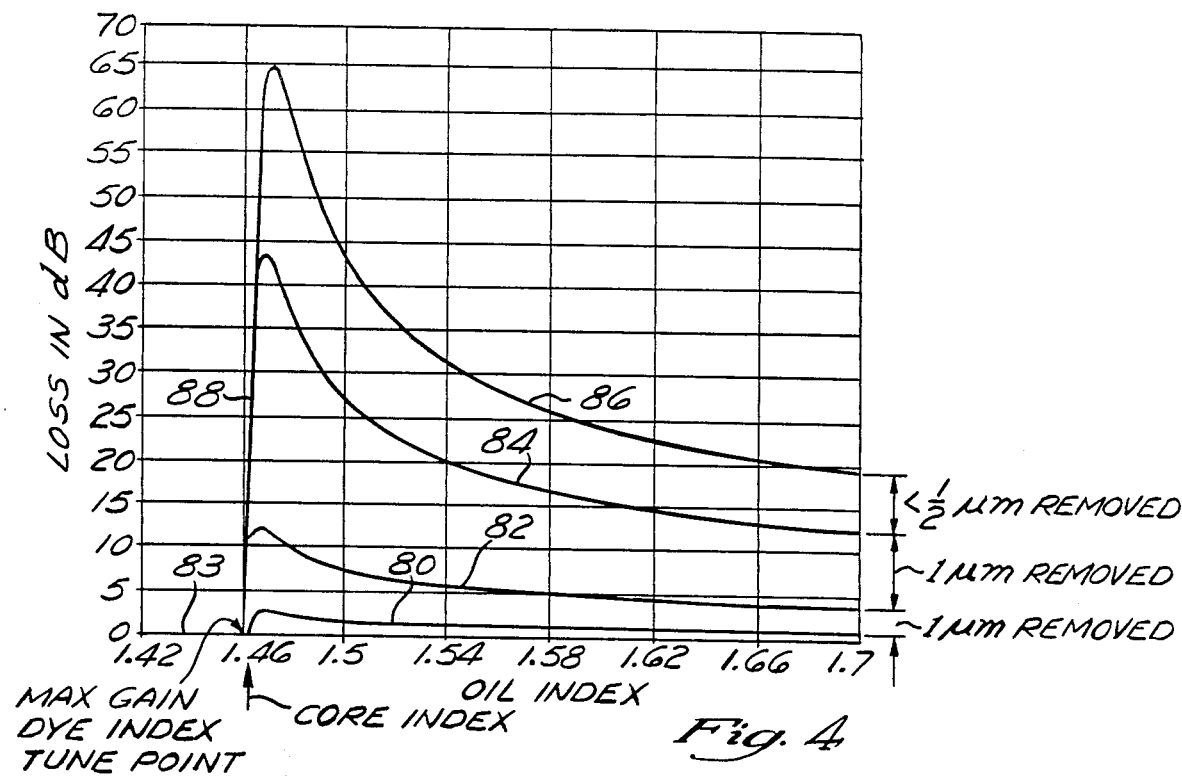
FIG. 4 is a graph of oil drop test results, utilized to determine the amount of cladding to remove.

Referring to FIG. 1, the preferred embodiment of the invention comprises an optical fiber waveguide 20, mechanically affixed to a fiber holder 22. The fiber 20 comprises a commercially available fiber of quartz glass which is doped to have a central core (not shown) and an outer cladding. By way of example, the diameter of the cladding may be on the order of 100 micrometers, and the core may have a diameter of about 5 to 10 micrometers. The fiber 20 is preferably made of a relatively pure silica ($SiO_2$), with a core of relatively large refractive index surrounded by a cladding of relatively low refractive index. It is desirable to use a fiber 20 with a very low concentration of impurities, such as the transition elements iron and copper, as well as very low concentrations of other impurities such as $OH^-$ ions. Such impurities within the structure of the fiber can cause absorption and scattering losses.

A portion of the cladding of the fiber 20 is removed by polishing, or other suitable means, to form a facing surface 28 which is coplanar with the upper surface 26 of the holder 22. The facing surface 26 is covered with a solution 30 of a solute such as a saturable absorbing dye dissolved in a suitable index-matched solvent. By way of specific example, the solvent may be 1,2 dichloroethane and the dye may be Eastman No. 9860.

Referring to FIG. 2, in the preferred embodiment, the fiber holder 22 has an upper surface 26 in which a longitudinal, arcuate groove 24 is formed. The groove 24 has a radius of curvature of approximately 25 centimeters, which is much larger than the diameter of the fiber 20. The width of the groove 24 is slightly larger than the diameter of the fiber 20. The depth of the groove 24 varies from a minimum at the center of the block 22 to a maximum at the edges of the block 22. When the fiber 20 is mounted in the groove 24, the fiber 20 conforms to a path defined by the bottom surface of the groove 24, and the fiber 20 gradually converges with the surface 26 toward the center of the block 22 and diverges from the surface 26 toward the edges of the block 22. This eliminates any sharp bends or abrupt curves in the direction of the fiber 20 which could cause power loss through mode perturbation. In the preferred embodiment illustrated, the groove 24 is shown as rectangular in cross-section, but it will be understood that the groove 24 could have any other suitable cross-section, such as a U-shape or a V-shape. Techniques for forming the groove 24 are well known in the art.

The fiber 20 is affixed, e.g. by a suitable adhesive, in the groove 24 of the block 22. The block 22 and the adhesive are preferably of the same approximate coefficient of thermal expansion and the same approximate hardness as the fiber 20.

In the preferred embodiment, the fiber 20 and holder 22, as described above, comprise one half of a directional coupler to which the solution 30 is applied. The structure of the coupler half is described in detail in U.S. Pat. No. 4,493,528, issued on Jan. 15, 1985; and in U.S. Pat. No. 4,536,058, issued on Aug. 20, 1985; both of which are incorporated herein by reference. A brief description of the construction of a coupler half follows.

It can be seen from FIG. 3 that a portion 40 of the cladding 36 is removed to form the facing surface 28 as previously discussed in connection with FIG. 2. This portion of cladding 40 can be removed by any method which can precisely control the amount of cladding removed; however, it is important that precise control over the amount of cladding removed be maintained so that the core 34 is not exposed. Typically, the removal is accomplished by simultaneously polishing the fiber 20 with the entire upper surface 26 until the required portion 40 of cladding 36 has been removed.

The polishing of the surface 16 forms the oval, planar facing surface 28 on the fiber 20. The facing surface 28 can be brought closer to the core 34 by continued polishing of the upper surface 26 until a sufficient amount of material of the upper surface 16 and a corresponding amount of material in the cladding 36 has been removed. However, once too much material has been removed, (i.e, the facing surface 28 reaches the core 34), it is not possible to add cladding material back onto the fiber 20. Thus, a technique is required for terminating the polishing prior to that occurrence.

The dashed lines 38 in FIG. 3 represent the relative electric field distribution 38 of a light wave traveling in the fiber 10 and its relationship to the core 34, and the cladding 36. In the embodiment shown, the diameter of the core 34 is selected to support only one mode in the wavelength range of the optical signal throughout the fiber 20 and is typically less than te nmicrometers. The mathematical derivation of the electromagnetic field distribution 38 involves solutions of Maxwell's equations. Many variables are involved and no attempt will be made here to characterize the field distribution, as this derivation is well known in the art.

It can be seen in FIG. 3 that the evanescent field 38 outside the diameter of the core 34 decreases rapidly with distance into the cladding. Enough cladding material 40 must be removed such that the evanescent field portion 44 extends substantially beyond the facing surface 28 of the fiber 20. To determine how much cladding material should be removed to accomplish this result, an "oil drop" test is used.

Referring to FIG. 4, there is shown a series of curves 80, 82, 84, 86, each of which represents a different amount of removal of the cladding portion 40 (FIG. 3), i.e., a different closeness of the surface 28 to the core 34. The curves plot radiation losses at the surface 28 as a function of the refractive index of an ordinary index matching oil 87, placed on the facing surface 28, as shown in FIG. 3 in phantom lines. Such losses are indicative of the extent of penetration of the evanescent field 44 (FIG. 3). FIG. 4 was obtained by measuring the amount of optical output power ($P_{out}$) from the fiber 20 for a given amount of input power when oil drops having different indices of refraction are placed on the facing surface 28 as compared to the optical power transmitted in the absence of the oil ($P_{max}$). For example, if the signal output without the oil (i.e., $P_{max}$) is 100 milliwatts, the 3-db point on the loss scale represents a loss of approximately 50 milliwatts at the facing surface (i.e., $loss_{db} = -10 \log_{10}(P_{out}/P_{max}) = -10\log_{10}$ (50 milliwatts/100 milliwatts) $= -10\log_{10}(0.5) = 3$ dB). Similarly, the 20-dB point represents a loss of approximately 99 milliwatts (i.e., $loss_{dB} = 10 \log_{10}(1$ milliwattt/100 milliwatts) $= -10 \log_{10}(0.01) = 20$ dB). The test results illustrated in FIG. 4 were obtained using a Corning Glass fiber with a core having a diamter of six micrometers and a refractive index of about 1.46. The radius of curvature of the half coupler groove 24 is 25 centimeters. The wave length of the light was 1.064 micrometers and the input power was 0.7 milliwatts. The index of refraction is varied by using oils of different refractive indexes.

The curve 80 shows the radiation losses at the face 28 with a small amount of the cladding portion 40 removed. When the index of the oil is slightly below the index of the core, then complete internal reflection with little or no loss will occur. This corresponds to the region on the horizontal axis between the index 1.42 and the index 1.46 designated by the reference numeral 83 in FIG. 4. As the index of the oil approaches the index of the core, no loss occurs until the index of the oil approximately reaches the indx of the core. This is illustrated by the abrupt upward transition line 88 around the index value 1.46 in FIG. 4. The curve 80 illustrates that, if a small amount of cladding is removed, the losses for oil index values of 1.46 and higher are less than approximately 3 dB. The losses peak at index values slightly greater than 1.46, and then become slightly less for higher index values. These losses result from the penetration of the evanescent field 44 (FIG. 3) past the facing surface 28 resulting in radiation loss. Since the curve 80 represents a removed portion 40 of the cladding which is small, the evanescent portion 44 (FIG. 3) of the electromagnetic field distribution 38 extends out of the cladding by only a small amount, and the losses are correspondingly small.

The curve 82 in FIG. 4 represents losses experienced when approximately one more micrometer of cladding 40 is removed. This corresponds to a facing surface 28

(FIG. 3) which is closer to the core 34 toward the peak of the electromagnetic field distribution 38. It will be recalled from FIG. 3 that a movement of the facing surface 28 toward the core 34 results in more evanescent field portion outside the facing surface 28 because the strength of the evanescent field 44 protruding past the facing surface 28 increases as the facing surface 28 gets closer to the core 34. As the index of the oil on the facing surface 28 is increased until it matches or slightly exceeds the core index, the losses increase to approximately 12 or 13 dB, as shown by the curve 82 in FIG. 4. For oil with higher index values, the losses decrease to about 5 dB for an oil of index 1.7. In the present invention, a substantial portion 44 of the electromagnetic field distribution 38 (FIG. 3) should preferably extend past the facing surface 28, so as to provide adequate absorption when the dye solution 30 is applied to the facing surface 28. By way of example, sufficient cladding may be removed such that the facing surface 28 is close enough to the core to result in a loss of between 40 and 65 dB when the oil index is approximately equal to the core index. The curves 84 and 86 in FIG. 4 satisfy this requirement and correspond to positions for the facing surface 28 relative to the core 34 for adequate absorption when a dye solution 30 is placed in contact with the facing surface 28.

The curves 80, 82, and 84 correspond to one micrometer increments of removal of the cladding portion 40. However, it is apparent from FIG. 4 that for the curve 84, the losses at the transition line 88 for an oil index of slightly above 1.46 are 45 dB, which exceeds the loss found on the curve 82 at the line 88 by more than 30 dB for an oil of substantially the same index. This nonlinearity results from the bell shaped distribution of the electric field magnitude illustrated by the curve 38 in FIG. 3. That is, as the facing surface 28 approaches closer to the core 34 in equal increments of distance, the amount of loss at the surface 18 increases by a substantially greater margin for each additional increment.

No absolute value for the distance of the facing surface 28 from the core 34 can be specified, because the amount of evanescent field 44 extending past the facing surface 28 depends upon the wave length of the light in the core 34 as well as the core diameter and the relative indexes of the core 34 and cladding 36. For example, the amount of penetration of the evanescent field 44 into the cladding 36 generally becomes greater as the diameter of the core 34 becomes smaller. Monomode fibers are preferably for the absorption device of the present invention because they have a greater percentage of the electromagnetic field 38 in the cladding 36, as compared to multimode fibers.

As indicated above, a relatively high transmission loss on the order of 40 to 65 dB, as determined by the oil drop test, is desirable, because it indicates that a relatively substantial penetration of the evanescent field 44 past the facing survace 28 has occurred. However, if too much cladding is removed such that the facing surface 28 touches or penetrates the outer perimeter of the core 34, very high and unacceptable losses will result, due to mode perturbation. Thus, care should be taken not to polish so far that the facing surface 28 comes into contact with the core 34.

As shown in FIGS. 1, 2, and 3, the facing surface 28 is formed on one side of the fiber 20. Thus, the saturable absorber described herein can be formed on a single, congtinuous, uninterrupted length of optical fiber which requires no splices or connections.

After the proper amount of cladding has been removed—e.g. so that only about one micrometer of cladding covers the fiber core at the center of the facing surface 28 as shown in FIG. 3—the block 22 and fiber 20 are cleaned, to remove the oil and any contaminants, and the facing surface 28 is covered with the solution 30 (FIG. 1) of a saturable absorbing material such as dye, e.g. Eastman No. 9860. As discussed above, the dye is dissolved in a suitable index-matched solvent such as 1,2 dichloroethane. The Eastman dye has an absorption peak at 1.051 micrometers. Preferably, the dye should not appreciably change the refractive index of the solvent which, in the embodiment shown, is approximately 1.444. Since the refractive index of the fiber core 34 of the preferred embodiment is typically 1.454, the optical signal is well guided through the core 34 in the area of the facing surface 28, yet the evanescent field 44 of the light in the fiber core 34 extends past the facing surface 28, as illustrated in FIG. 3.

Figure 5:
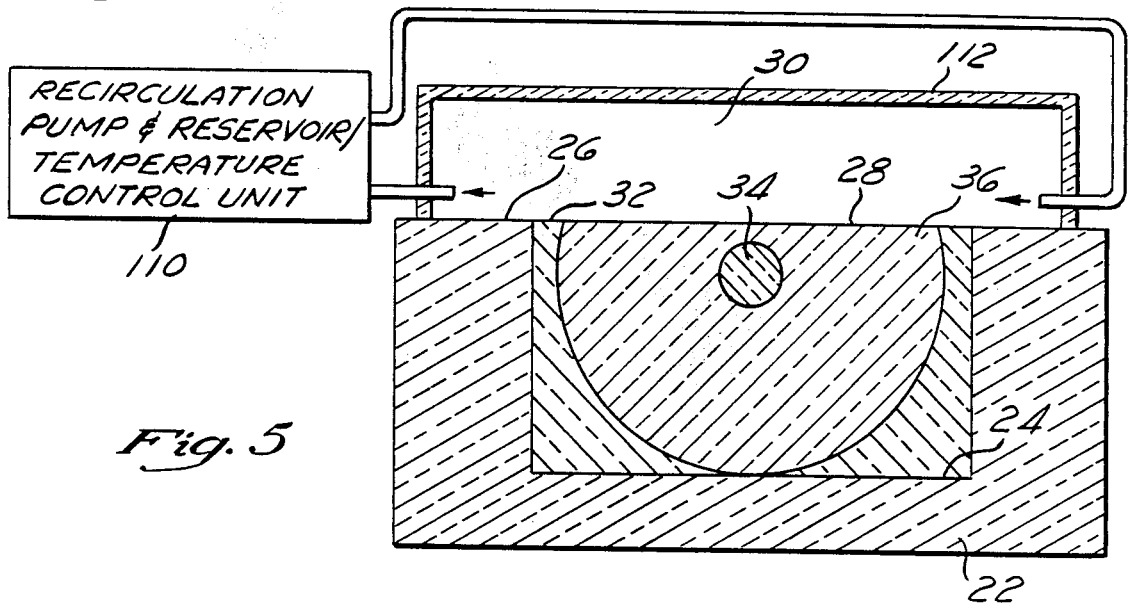
FIG. 5 shows the absorber of FIG. 3 with the addition of a recirculation pump and temperature control unit.

As shown in FIG. 5, the dye 30 may be contained by means of a dye cavity 112, mounted to the upper surface 26 of the fiber holder 22. The dye cavity 112 comprises a box-like structure which, by way of example, can be formed of glass or other suitable material, which is sealed to the surface 26 and which retains the dye solution 30 in contact with the facing surface 28. In constructing the half coupler which forms the base for the device, the groove 24 should preferably be filled with a suitable adhesive 32, such as epoxy, such that the upper surface 26 is uniformly flat, as this facilitates sealing the dye cavity 112 to the upper surface 26.

The dye cavity 112 may be interconnected by tubing with a recirculation pump and temperature control unit 110. This recirculation pump and temperature control unit 110 is conventional, and any apparatus which is capable of circulating the dye solution 30 to and from the facing surface 28 on the half coupler 22 will be adequate.

The recirculation pump and temperature control unit 110 serves at least two beneficial purposes. One purpose is to maintain the refractive index of the dye at a constant value. The absorption process causes the dye solution 30 to absorb energy from the light, thus causing the temperature to gradually rise. As the temperature rises, the refractive index of the dye solution 30 decreases and reduces the penetration of the evanescent field 44 of the optical signal into the dye solution. Since less light energy extends into the dye solution 30 less light energy is absorbed and the transmission increases. The recirculation pump and temperature control unit 110 tends to maintain the temperature of the dye solution 30 at a relatively constant level, thus avoiding the change in refractive index and concomitant change in attenuation.

The other purpose of the recirculation pump and temperature control unit 110 is to replenish the dye molecules in the solution 30. The light-absorbing dye in the dye solution 30 is typically a large organic molecule which may break down after a finite number of excitations by light energy. After a molecule has broken down, it can no longer absorb light energy. Thus, if the same dye solution 30 is allowed to remain in contact with the facing surface 28, the dye solution 30 would quickly lose its light-absorbing characteristics.

The recirculating pump and temperature control unit 110 typically has a dye solution reservoir (not shown) which has a capacity much greater than the capacity of the dye cavity 112. The dye solution 30 from the dye cavity 112 is constantly returned to the reservoir in the recirculating pump and temperature control unit 110 where the dye molecules which have broken down are mixed with usable molecules. Because of the large capacity of the reservoir, the concentration of the unusable dye molecules remains insignificantly small. Thus, the light-absorbing characteristics of the dye solution 30 remain substantially constant. The usable lifetime of the dye solution 30, of course, depends upon the frequency, duty cycle, and intensity of optical pulses propagating through the device and upon the size of the reservoir.

Figure 6:
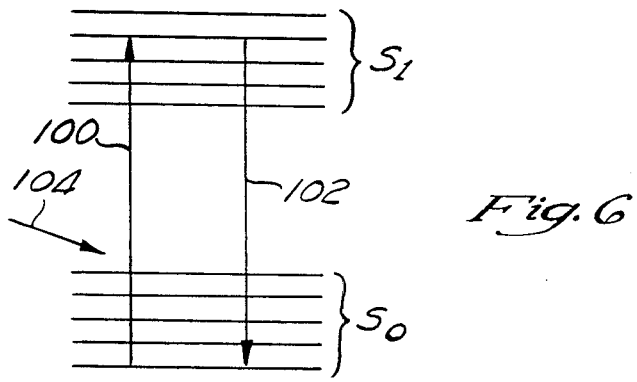
FIG. 6 illustrates the energy levels of a typical atom of an exemplary solute such as a saturable absorbing dye.

FIG. 6 is a simplified illustration of the energy states of typical atoms in the dye. With no light impinging on the dye, substantially all of the atoms in the dye solution are found in the lowest energy levels indicated as $S_0$. When an atom (not shown) in state $S_0$ absorbs light energy (illustrated by the reference numeral 104), its energy level will make the transition 100 from state $S_0$ to state $S_1$. After the relaxation time of the dye, (e.g., $9.1 \times 10^{-12}$ seconds for Eastman No. 9860), the atom of the dye will exit the excited state, $S_1$, and make a non-radiative transition 102 back to the lower energy state, $S_0$. The atom will then be able to absorb further light energy.

For any concentration of dye, only a finite number of atoms will be available to absorb light energy, namely those atoms in the low energy state, $S_0$. As the intensity of the impinging light increases, the atoms spend a larger percentage of their time in the higher energy levels, $S_1$. Thus, there are less atoms in the lower energy states, $S_0$, to absorb further light energy. Thus, as the intensity of the light increases, a decreasing percentage of the light is absorbed. Therefore, the percentage transmission of the light signal in the fiber increases as the signal intensity increases.

The percentage of light absorbed at low signal intensities is determined by the concentration of the dye in the solution 30. For example, the concentration may be adjusted such that at low signal intensities, the percentage of absorption is approximately 50 percent of the signal energy. The remaining 50 percent of the signal energy continues to pass through the fiber 20 (FIG. 3). As the relative signal intensity increases, the percent of absorption decreases due to saturation of the atoms in the dye, as explained above. Thus, as the relative signal intensity increases, the percentage of transmission also increases.

Figure 7:
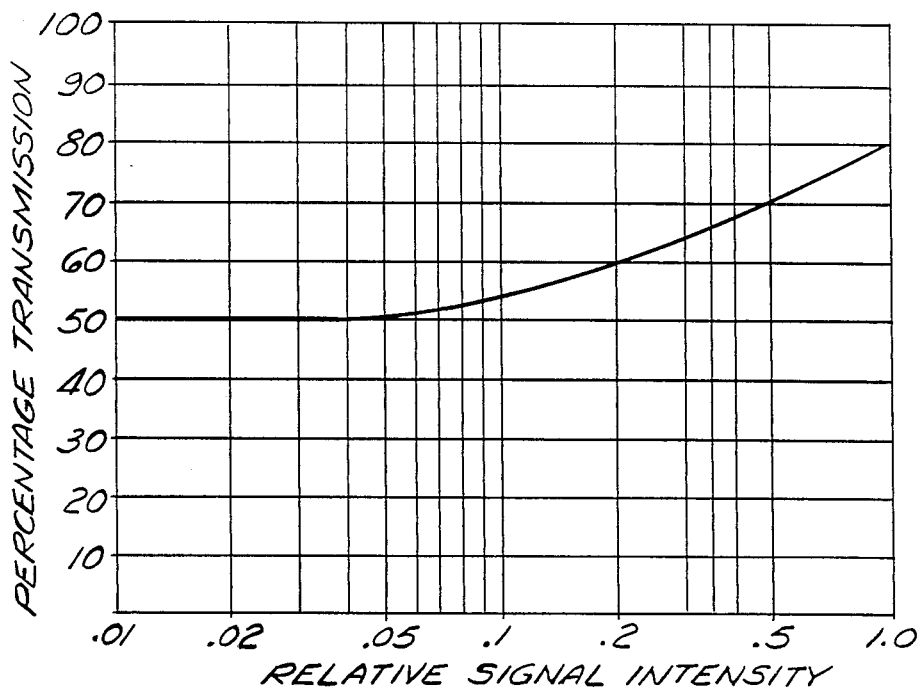
FIG. 7 is a graph of percentage of transmission through the saturable absorber as a function of the relative signal intensity of the optical data signal.

The foregoing is illustrated in FIG. 7 which shows the percentage of transmission as a function of relative (or normalized) signal intensity for an exemplary dye solution. By way of example, if the maximum signal intensity is 100 watts and has a normalized value of 1.0, a relative signal intensity of 0.2 would correspond to a signal intensity of 20 watts. The relative signal intensity is plotted on a logarithmic scale to more clearly illustrate that at low relative signal intensities (e.g., below 0.01), the percentage of absorption in an examplary device is substantially constant (e.g., approximately 50 percent). As the relative signal intensity approaches a normalized value of 1.0, the percentage of transmission increases (e.g., approaches approximately 80 percent). As indicated by FIG. 7, the percentage of transmission is a nonlinear function of the relative signal intensity, thus providing the desired nonlinear attenuating characteristics.

At low signal intensities (i.e., below one percent of the maximum relative intensity), the absorption characteristics of the light-absorbing dye remain substantially constant. Thus, for the example presented above (i.e., a maximum intensity of 100 watts), the absorption at intensities of one watt or less is approximately 50 percent. When the signal intensity begins increasing above one watt, the percent of absorption begins decreasing and, thus, the percent of transmission increases as illustrated in FIG. 7. As will be seen below, the noise levels of interest are typically less than one percent of the data signal intensity and are therefore attenuated by 50 percent as compared to only 20 percent attenuation for the higher level data signal.

Figure 8:
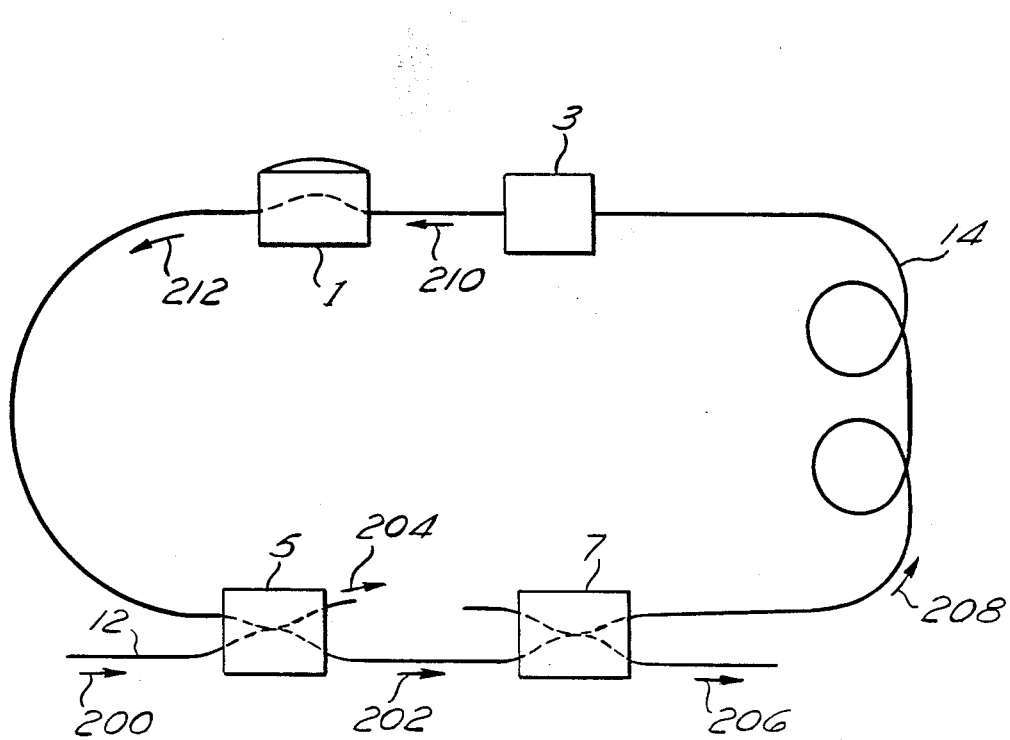
FIG. 8 illustrates the use of the present invention in a recirculating memory device.

An examplary use for the saturable absorber of the present invention is illustrated in FIG. 8. The absorber 1 is formed on a loop 14 of a recirculating memory device such as that described in U.S. Pat. No. 4,479,701, issued on Oct. 30, 1984, which is incorporated herein by reference. The loop 14 also has an amplifier 3 formed on the loop. The amplifier 3 may be a fiber optic amplifier such as is described in U.S. Pat. No. 4,546,476, issued on Oct. 8, 1985, which is also incorporated by reference. An optical signal 200, e.g. in the form of a pulse, enters the recirculating memory device through the input end of the fiber 12. An optical coupler 5 having a coupling ratio of 95 percent couples the input portion of the fiber 12 to the loop 14, and discards approximately 95 percent of the input light 200 as discard signal 104. The remaining 5 percent of the input light continues in fiber 12 as signal 202 to coupler 7, which couples the loop 14 and the output portion of the fiber 12. Ninety-five percent of signal 202 is coupled by the coupler 7 to the loop 14 as signal 208. The remaining 5 percent is output at the output end of the device as signal 206. The signal 208 propagates through the loop 14, then passes through the amplifier 3, where it emerges as the signal 210. This signal 210 then passes through the absorber 1, where it emerges as the signal 212, for propagation to the coupler 5. Ninety-five percent of signal 212 is coupled by coupler 5 from the loop 14 to the fiber 12 to provide the signal 202. Five percent of signal 202 is output as signal 206 and 95 percent returns to loop 14 as signal 208. Thus, the light makes multiple recirculations through the loop 14 to provide multiple signals 206 at the output of the memory device.

The signals 206 at the output will be a series of pulses identical to the input pulse 200. However, unless amplified by the amplifier 3, the signal 206 will be degraded with time, due to light lost at the couplers 5, 7 and attenuation in the loop 14, and will thus eventually become too small to be usable. In order to increase the number of usable signals, amplifer 3 advantageously amplifies the signal 208 to provide compensation for the attenuation of the loop and for the 5 percent of the signal lost in the coupler 5 and the 5 percent output from the coupler 7 during each recirculation of light in the loop. However, the amplifier 3 may cause the introduction of noise and degradation of the pulse shape, as discussed below in reference to FIGS. 9 and 10.

FIG. 9 illustrates an exemplary ideal pulse train in a recirculating memory device. Pulses 300, 302, 304 are exemplary data pulses having a Gaussian energy distribution. As shown for the pulse 302, approximately 68 percent of the light energy is between the points a and a', approximately 95 percent of the light energy is between points b and b', and over 99 percent of the light energy is between points c and c'. The zero signals 306, 308 between the data pulses 300, 302, 304 represent ideal zero levels having no light energy. Thus, a device connected to the output of an ideal recirculating memory device having the signals illustrated in FIG. 9 would receive clearly distinguishable high and low energy levels.

FIG. 10 illustrates non-ideal data pulses 300', 302', 304' corresponding to data pulses 300, 302, 304 of FIG. 9. (Data pulses 300, 302, 304 are shown in dashed lines for comparison.) These non-ideal data pulses 300', 302' and 304' are distorted relative to the ideal pulses 300, 302 and 304, respectively. Such distortion may be caused by fiber dispersion or during amplification of the pulses by the amplifier 3 (FIG. 8). As shown, the non-ideal data pulse 302' contains an increased percentage of light energy in the leading portions 310 and trailing portions 312 (i.e., before b and after b'), relative to that of the ideal pulse 302. Although exaggerated in FIG. 10 for clarity, the intensity of pulse 302' before c and after c' is typically less than one percent of the intensity at the center 314 of pulse 302'; however, further amplification of pulse 302' (e.g. due to multiple circulations in the loop 14 of FIG. 8) will cause the intensity in the leading portion 310 and trailing portion 312 to increase. Thus, after continued recirculation and amplification, pulse 302' will broaden until it becomes unuseable for applications where the pulse width is important.

As also illustrated in FIG. 10, amplifier 3 may also cause the zero signals 306', 308' between the data pulses 300', 302', 304' to have a small amount of noise energy, e.g. due to imperfections in the fiber, the amplifier, or other components in the recirculating memory device. Although the noise is exaggerated in FIG. 10 for clarity, the noise levels are typically less than one percent of the maximum amplitude of the pulse 302'. However, if this noise is allowed to recirculate in the device, the noise energy in the zero signals 306', 308' will be amplified to increased levels which can be detected as signal levels.

The saturable absorber 1 (FIG. 8) of the present invention reduces the amplitude of the leading portion 310, trailing portion 312 and zero signals 306', 308' by selectively attenuating the signals. As explained before with respect to FIG. 7, the saturable absorber attenuates a higher percentage of low-level signals than high-level signals. In a typical recirculating memory device, the data pulse 302' could have a maximum intensity of several watts while the levels of the energy in the leading portion 310, trailing portion 312, and zero signals 306', 308' are much less than one watt. Thus, the leading portion 310, trailing portion 312 and zero portions 306', 308' will be attenuated by, for example, 50 percent while the center portion 314 is attenuated by, for example, only 20 percent (i.e., 80 percent of the center portion 314 is transmitted and 50 percent of the leading portion 310, trailing portion 312 and noise portions 316, 318 are transmitted). This is illustrated in FIG. 10 (in dashed lines) as data pulse 302" and zero signals 306", 308".

When data pulse 302" is again amplified, the center portion 314 typically will be restored to its original amplitude with the remaining portions of the pulse 302" amplified by the same percentage. However, since the leading portion 310, trailing portion 312, and zero signals 306", 308" have been attenuated by a larger percentage, they will be restored to amplitudes that are less than their respective amplitudes prior to attenuation. Thus, energy that occurs in the leading portion 310, trailing portion 312, or zero portions 306, 308 will be attenuated before it increases to an amplitude which causes distortion of the data signals.

The foregoing may be further illustrated in reference to the exemplary memory device of FIG. 7, by way of example. Assuming that absorber 1 attenuates high signals by 20 percent and low signals by 50 percent, the amplitude of the pulse 212 will be reduced by the absorber 1 to approximately 80 percent of the amplitude of pulse 210. The amplitude of the pulse 202 will be reduced by 5 percent from the amplitude of pulse 212, i.e., 77 percent of pulse 210; and the amplitude of pulse 208 will be reduced by 5 percent from the amplitude of pulse 202, i.e., to approximately 73 percent of pulse 210. The loop 14 will also have some losses which will further reduce the amplitude of the pulse entering the amplifier 3 to approximately 70 percent, for example. Thus, the amplifier will have an amplification factor of approximately 143 percent (i.e., 1.0/0.70) in order to restore the pulse 210 to the amplitude it had on the previous circulation through the loop. During the same circulation, noise energy will have been reduced to 50 percent of its amplitude by the absorber 1, and to 47 percent and 45 percent by couplers 5 and 7, respectively. With the amplification factor of the amplifier 3 set to 143 percent, the amplitude of the noise energy will be amplified to approximately 64 percent of its amplitude from the previous circulation through the loop. Thus, even with further amplification of the noise, the absorber 1 has substantially inhibited the gradual increase in noise energy which would occur if the absorber was not present.

Although the operation of the device has been described above with regard to a recirculating memory device, the same operational principals apply to the selective attenuation of noise and signal levels in other optical fiber systems where signal conditioning or reshaping is important, such as re-entrant gyroscopes, data systems, and communication systems.

What is claimed is:

1. A fiber optic saturable absorber, for processing an input optical signal having at least two optical signal intensity levels within a range of optical intensity levels, comprising:
   an optical fiber having a core and a cladding, the cladding forming a surface at a selected location on the fiber, which is in close proximity to the core for exposing the evanescent field of said input optical signal at said selected location; and
   a light-absorbing substance applied to the surface at said selected location on the fiber, said light-absorbing substance comprising a plurality of atoms having first and second energy levels, said first energy level being a stable energy level and said second energy level being an unstable energy level, said atoms absorbing light energy and transitioning from said first energy level to said second energy level, said atoms thereafter transitioning back to said first energy level without emitting radiation, the amount of light energy absorbable by said plurality of atoms and causing transitions to said second energy level determined by the concentration of said atoms in said substance, said concentration selected for said range of input optical intensities so that said light-absorbing substance has nonlinear light-absorbing characteristics for said range of input optical intensities thereby causing selective attenuation of said input optical signal propagating within said optical fiber, such that the percentage of absorption of said input optical signal by said light-absorbing substance decreases as the intensity of said input optical signal increases.

2. The fiber optic saturable absorber as defined in claim 1, wherein the surface at the selected location on the optical fiber is formed on one side only of said fiber to provide a facing surface at which the evanescent field of said input optical signal within the fiber is exposed to said light-absorbing substance.

3. The fiber optic saturable absorber as defined in claim 2, wherein the light-absorbing substance comprises a solution of an index-matching material and a saturable light-absorbing dye.

4. The fiber optic saturable absorber as defined in claim 3, wherein the light-absorbing substance has characteristics such that the percentage of said input optical signal absorbed is substantially constant below a threshold signal intensity, and wherein the percentage of said input optical signal absorbed decreases as the signal intensity increases above the threshold level.

5. The fiber optic saturable absorber as defined in claim 1, wherein the percentage of said input optical signal absorbed by the substance decreases nonlinearly as the intensity of the input optical signal increases.

6. A method of processing an input optical signal having first and second different signal levels, comprising the steps of:
propagating said input optical signal through a single, continuous, uninterrupted length of optical fiber; and
selectively attenuating the intensity of said first and second signal levels at a selected location along said single, continuous, uninterrupted length of optical fiber so that the difference between said first and second signal levels, expressed as a percentage of one of said signal levels, is increased.

7. The method of processing an input optical signal as defined in claim 6, wherein said step of selectively attenuating the intensity of said first and second signal levels comprises removing a percentage of the intensity of said signal from said optical fiber, said percentage decreasing as the intensity of the signal increases.

8. The method of processing an input optical signal as defined in claim 7, wherein said percentage of intensity decreases nonlinearly as the intensity of the signal increases.

9. The method of processing an input optical signal as defined in claim 7, wherein said removing step comprises absorbing said percentage of intensity by applying a light-absorbing substance to said selected location.

10. The method of processing an input optical signal as defined in claim 9, additionally comprising:
circulating said light-absorbing substance across a surface at said selected location on the fiber; and
controlling the temperature of said light-absorbing substance to maintain a substantially constant temperature.

11. The method of claim 6, wherein said first and second signal levels correspond to first and second data information states.

12. A method of manufacturing a selective attenuator for an optical fiber data system, comprising the steps of:
providing an optical fiber having a surface which exposes the evanescent field of an optical signal propagating therethrough; and
applying a light-absorbing substance having nonlinear light-absorbing characteristics to the surface to cause absorption of a percentage of the optical energy from said evanescent field, said substance being a saturable absorbing material selected to attenuate said optical signal such that said percentage decreases as the intensity of said optical energy in said optical signal increases.

13. The method of manufacturing a selective attenuator as defined in claim 12 further including the step of combining an index-matching material with a light-absorbing dye to form the light-absorbing substance.

14. In an optical fiber system having an input optical signal propagating therein, said input optical signal having optical energy at first and second signal levels corresponding to first and second data information states, said first signal level lower than said second signal level, said input optical signal having a shape defined (1) by the percentage difference in said first and second signal levels, said percentage difference being the difference in said signal levels expressed as a percentage of one of said signal levels, and (2) by transitions between said first and second signal levels, wherein said percentage difference in said first and second signal levels decreases as said input optical signal propagates in said optical fiber system thereby causing said shape to change, a method of restoring the shape of said input optical signal comprising the steps of:
exposing a portion of the optical energy of said input optical signal to a light-absorbing material having nonlinear light-absorbing characteristics; and
absorbing a percentage of the optical energy of said input optical signal, the percentage of said optical energy absorbed being relatively greater for optical energy near said first signal level than for optical energy near said second signal level, so that said first signal level is decreased by a greater percentage than said second signal level and said percentage difference between said first and second signal levels is thereby increased.

* * * * *

UNITED STATES PATENT AND TRADEMARK OFFICE
CERTIFICATE OF CORRECTION

PATENT NO. : 4,778,237

DATED : October 18, 1988

INVENTOR(S) : Sorin et al.

It is certified that error appears in the above-identified patent and that said Letters Patent is hereby corrected as shown below:

Column 3, line 48, change "surface 16" to --surface 26--.

Column 3, line 53, change "surface 16" to --surface 26--.

Column 3, line 61, change "fiber 10" to --fiber 20--.

Column 4, line 32, change "$loss_{dB} = 10 \log_{10}(1\text{ milliwattt}/100$" to --$loss_{dB} = -10 \log_{10}(1\text{ milliwatt}/100$--.

Column 5, line 38, change "surface 18" to --surface 28--.

Column 8, line 25, change "signal 104" to --signal 204--.

Signed and Sealed this

Fifth Day of June, 1990

Attest:

HARRY F. MANBECK, JR.

Attesting Officer

Commissioner of Patents and Trademarks